(12) United States Patent
Rothkopf et al.

(10) Patent No.: US 11,914,141 B1
(45) Date of Patent: Feb. 27, 2024

(54) ELECTRONIC DEVICE WITH PROTECTED LIGHT SOURCES

(71) Applicant: Apple Inc., Cupertino, CA (US)

(72) Inventors: Fletcher R. Rothkopf, Los Altos, CA (US); James W. Vandyke, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 16/455,416

(22) Filed: Jun. 27, 2019

Related U.S. Application Data (60) Provisional application No. 62/721,744, filed on Aug. 23, 2018.

(51) Int. Cl.
  *G02B 27/00* (2006.01)
  *G02B 27/01* (2006.01)
  *G06F 3/01* (2006.01)
  *G06V 40/18* (2022.01)

(52) U.S. Cl.
  CPC ..... *G02B 27/0093* (2013.01); *G02B 27/0101* (2013.01); *G02B 27/0172* (2013.01); *G06F 3/013* (2013.01); *G06V 40/18* (2022.01)

(58) Field of Classification Search
  CPC ............ G02B 27/0093; G02B 27/0101; G02B 27/0172; G06F 3/013; G06K 9/00597
  See application file for complete search history.

(56) References Cited

U.S. PATENT DOCUMENTS

| | | | |
|---|---|---|---|
| 5,685,636 A | 11/1997 | German | |
| 6,196,702 B1 | 3/2001 | Krietzman | |
| 6,274,927 B1 | 8/2001 | Glenn | |
| 6,661,084 B1 | 12/2003 | Peterson | |
| 8,044,418 B2 | 10/2011 | Loh et al. | |
| 9,829,710 B1* | 11/2017 | Newell | G09G 3/3258 |
| 2005/0151717 A1* | 7/2005 | Seo | H05B 45/18 |
| | | | 345/102 |
| 2006/0197198 A1 | 9/2006 | Chow et al. | |

(Continued)

OTHER PUBLICATIONS

Laser Safety Manual (Ball State University, Published May 2017) (Year: 2017).*

*Primary Examiner* — Yuzhen Shen
(74) *Attorney, Agent, or Firm* — Treyz Law Group, P.C.; G. Victor Treyz; Tianyi He (57) ABSTRACT

An electronic device such as a head-mounted device may have gaze tracking sensors and other circuits that include packaged light-emitting devices. The packaged light-emitting devices may each include a light-emitting component such as a light-emitting diode or laser that emits infrared light or light of other wavelengths. The packaged light-emitting devices may have protection circuitry. The protection circuitry of each device may include one or more sensors such as a package integrity sensor, a proximity sensor, a photodetector for measuring emitted light intensity, a temperature sensor for measuring a temperature associated with the light-emitting component, and a current sensor. A control circuit such as an integrated circuit containing a comparator or other analog circuitry and/or a digital control circuit may gather information from one or more of the sensors and may control the light-emitting component based on the sensor information to prevent elevated light emission intensities.

14 Claims, 7 Drawing Sheets

(56) References Cited

U.S. PATENT DOCUMENTS

| | | | |
|---|---|---|---|
| 2009/0027652 A1* | 1/2009 | Chang | G01C 3/08 |
| | | | 356/4.01 |
| 2009/0146157 A1 | 6/2009 | Chiu et al. | |
| 2011/0031865 A1 | 2/2011 | Hussell et al. | |
| 2011/0121181 A1* | 5/2011 | Costello | G01S 7/4813 |
| | | | 250/338.1 |
| 2011/0215360 A1 | 9/2011 | Wang | |
| 2015/0035744 A1* | 2/2015 | Robbins | G02B 27/0093 |
| | | | 345/156 |
| 2015/0282260 A1 | 10/2015 | Hussell et al. | |
| 2016/0004306 A1* | 1/2016 | Maltz | G02B 27/0172 |
| | | | 345/173 |
| 2016/0111236 A1* | 4/2016 | Jin | G05F 1/569 |
| | | | 323/276 |
| 2016/0198091 A1* | 7/2016 | Edwards | G06F 3/013 |
| | | | 348/78 |
| 2016/0223819 A1* | 8/2016 | Liu | G06F 3/013 |
| 2018/0024010 A1* | 1/2018 | Nakagawa | G01K 1/18 |
| | | | 374/135 |
| 2018/0203505 A1* | 7/2018 | Trail | G06F 1/163 |
| 2019/0018485 A1* | 1/2019 | Aleem | G06F 3/147 |
| 2019/0042842 A1* | 2/2019 | Cavin | G06T 7/74 |
| 2019/0042843 A1* | 2/2019 | Lawrence | G06K 9/00671 |
| 2019/0101757 A1* | 4/2019 | Martinez | G02B 27/0172 |
| 2019/0121134 A1* | 4/2019 | Pierer | G02B 26/10 |
| 2019/0229495 A1* | 7/2019 | Pierer | G02B 26/101 |
| 2020/0012101 A1* | 1/2020 | Yuki | G02B 27/0101 |

* cited by examiner

ELECTRONIC DEVICE WITH PROTECTED LIGHT SOURCES

This application claims the benefit of provisional patent application No. 62/721,744, filed Aug. 23, 2018, which is hereby incorporated by reference herein in its entirety.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems. The optical systems may include light sources that emit light.

It can be challenging to produce optical systems with light sources for use in head-mounted devices. Head-mounted devices may have a variety of configurations, which may entail changes to the optical systems. These changes may affect the operation of the light sources. If care is not taken, the process of designing and qualifying these systems can consume more resources than desired.

SUMMARY

An electronic device such as a head-mounted device may have gaze tracking sensors and other devices that emit light. A gaze tracking sensor or other device may, for example, include one or more packaged light-emitting devices soldered to a printed circuit. These light-emitting devices may include a light-emitting component such as a light-emitting diode or laser that emits infrared light or light of other wavelengths. To ease the process of designing and qualifying optical systems with light sources for electronic devices such as head-mounted devices, packaged light-emitting devices may be provided with protection circuitry that enhances light emission safety.

The protection circuitry of a packaged light-emitting device may include one or more sensors such as a package integrity sensor, a proximity sensor, a photodetector for measuring emitted light intensity, a temperature sensor for measuring a temperature associated with the light-emitting component, and a current sensor. The package integrity sensor may be used to detect when a cover of the packaged light-emitting device has been removed. The proximity sensor may detect when an external object such as a user's eye is in proximity to the light-emitting device. The photodetector may be configured to measure a portion of the emitted light that is reflected from a coating on an inner surface of the cover to monitor for elevated light emission from the light-emitting component. The temperature sensor may be thermally coupled to the light-emitting component. If the light-emitting component is emitting an elevated amount of light, the temperature of the light-emitting component may be elevated. The temperature sensor may therefore be used in monitoring for elevated light emission from the light-emitting component. A current sensor in a protection circuit may also be used in detecting potentially elevated light emission.

The packaged light-emitting device may have a control circuit. The control circuit may be an integrated circuit containing a comparator or other analog circuitry and/or a digital control circuit. During operation of the electronic device, the control circuit in the packaged light-emitting device may gather information from one or more of the sensors in the packaged light-emitting device and may control the light-emitting component based on the sensor information to prevent elevated light emission intensities.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain light sources. For example, a head-mounted device may have sensors such as gaze tracking sensors that emit infrared light beams towards a user's eyes. The gaze tracking sensors may monitor a user's eyes to detect the user's direction of gaze, eye position, and pupil size. Light sources may also be used in forming proximity sensors, distance sensors, gesture sensors, three-dimensional image sensors, and other input-output devices.

To help facilitate the development and qualification of head-mounted devices and to enhance safety, light sources can be provided with features that, in a self-contained fashion, limit user exposure to emitted light. These light sources, after testing to ensure regulatory compliance and compliance with other safety criteria, can be incorporated into a variety of different types of head-mounted device, thereby streamlining device development across different platforms.

Figure 1:
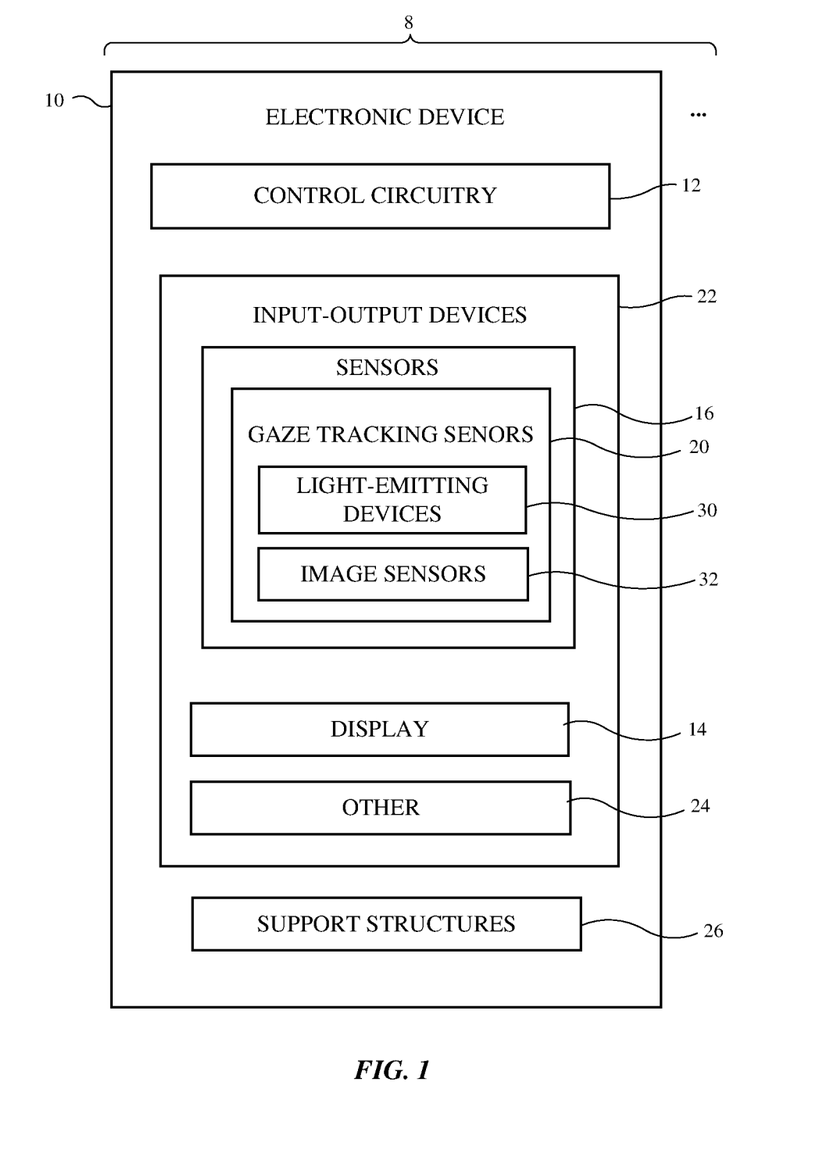
FIG. 1 is a schematic diagram of an illustrative electronic device such as a head-mounted display device in accordance with an embodiment.

A schematic diagram of an illustrative system having an electronic device with one or more light sources with protection circuitry is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the Internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes. Display 14 may be used to display images. The visual content that is displayed on display 14 may be viewed by a user of device 10. Optical systems that include lenses and other components may be used to allow a user with eyes located in eye boxes to view the content on display 14.

Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present computer-generated content such as virtual reality content and mixed reality content to a user. Virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, or other optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light), binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, proximity sensors (e.g., capacitive proximity sensors, optical proximity sensors, ultrasonic proximity sensors, and/or other proximity sensors), and/or other sensors.

As shown in FIG. 1, sensors 16 may include gaze tracking sensors 20. Gaze tracking sensors 20, which may sometimes be referred to as gaze tracking systems, gaze trackers, gaze detectors, or gaze tracker systems, may include light-emitting devices 30. Devices 30, which may sometimes be referred to as light sources or packaged light-emitting devices, may emit beams of light onto a user's eyes. Devices 30 may, for example, include infrared light-emitting diodes and/or infrared lasers (e.g., vertical cavity laser diodes or other laser diodes) that emit infrared light that is invisible to a user. The beams of light reflect from the user's eyes and can be imaged using image sensors 32. Sensors 20 may, as an example, include a left-eye gaze tracking sensor 20 that has a left infrared digital image sensor that detects reflected light from multiple beams of light directed towards the user's left eye through a left lens in device 10 and a right infrared digital image sensor that detects reflected light from multiple beams of light directed toward the user's right eye through a right lens in device 20. By processing the pattern of reflected light beams that is sensed using the image sensors, the positions of the user's eyes, pupil size, and the direction of view of each eye can be monitored in real time. This allows device 10 to perform functions such as foveated image rendering for display 14, wakefulness detection and other user monitoring operations, and other operations involving eye information.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12.

Figure 2:
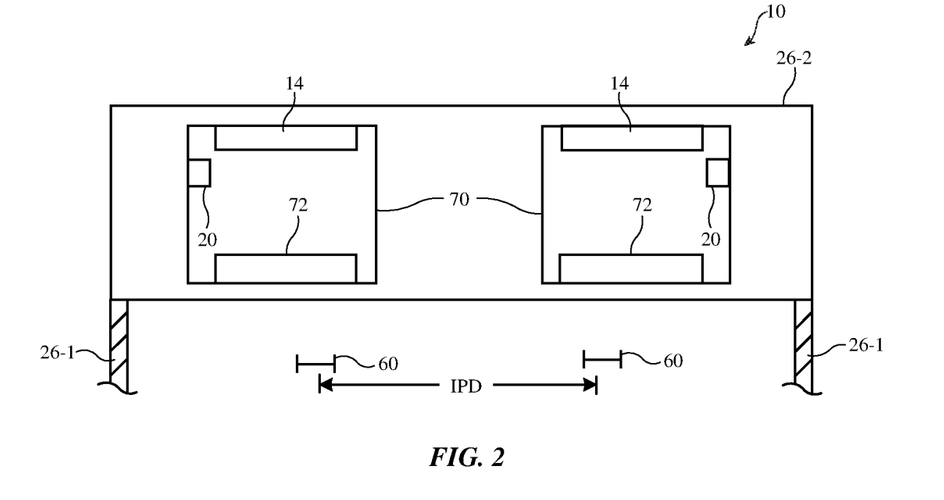
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, structures that form housing walls and other structures for main unit 26-2 (e.g., exterior housing walls, lens module structures and other support structures for optical components, etc.) and straps or other supplemental support structures such as structures 26-1 that help to hold main unit 26-2 on a user's face so that the user's eyes are located within eye boxes 60.

Display 14 may include left and right display panels (e.g., left and right pixel arrays, sometimes referred to as left and right displays or left and right display portions). These pixel arrays may be mounted respectively in left and right display modules 70 corresponding respectively to a user's left eye (and left eye box 60) and right eye (and right eye box). Modules 70, which may sometimes be referred to as lens support structures, lens housings, or lens and display housings, may, if desired, be individually positioned relative to the housing wall structures of main unit 26-2 and relative to a user's eyes using positioners. The positioners may include stepper motors, piezoelectric actuators, motors, linear electromagnetic actuators, and/or other electronic components for adjusting lens module positions. Positioners in device 10 may be controlled by control circuitry 12 during operation of device 10. For example, positioners may be used to adjust the spacing between modules 70 (and therefore the lens-to-lens spacing between the left and right lenses of modules 70) to match the interpupillary distance IPD of a user's eyes. This allows the user to view the left and right display portions of display 14 in the left and right lens modules.

The positions of the user's eyes in eye boxes 60 and therefore interpupillary distance IPD may be measured using gaze tracking sensors 20. There may be, for example, a respective gaze tracking sensor 20 in each lens module 70 or gaze tracking sensors may be mounted elsewhere in device 10. Each gaze tracking sensor 20 may have one or more light-emitting devices 30 (sometimes referred to as light sources) for emitting beams of infrared light onto a user's eye in eye box 60 through lens 72 and may have an infrared image sensor 32 to capture an corresponding image of the user's eye when the user's eye is illuminated by the infrared light beam. The captured image may then be processed using processing circuitry. This allows the gaze tracking sensor 20 to identify the direction of gaze of the user's eye, the location of the user's pupil, and the size of the user's pupil. By using a gaze tracking sensor 20 in each lens module 70, control circuitry 12 can measure the user's interpupillary distance IPD.

In addition to light-emitting devices 30 in gaze tracking sensors 20, device 10 may include additional light sources such as camera flash light sources, flashlight light sources, proximity detector light sources (e.g., an infrared light source that emits light that is detected by an associated optical proximity sensor photodetector after reflection from an external object to sense proximity of the external object), optical distance and/or velocity sensors (e.g., light detection and ranging or LIDAR sensors, self-mixing sensors for determining distance and/or velocity, etc.), gesture sensors, structured light three-dimensional image sensors that detect three-dimensional images by monitoring distortion in a grid of emitted light beams, and/or other light-emitting components. These components may be implemented using light-emitting diodes (e.g., organic light-emitting diodes and/or light-emitting diodes formed from crystalline semiconductor dies), lasers (e.g., vertical cavity surface emitting diode lasers and/or other diode lasers), and/or other sources of light. The light emitted from devices 30 and the other light sources of device 10 may be visible light, ultraviolet light, infrared light, and/or combinations of visible, ultraviolet, and/or infrared light. To enhance user eye safety, light sources in device 10 such as light-emitting devices 30 and/or the other light sources of device 10 may be provided with protection circuitry.

Figure 3:
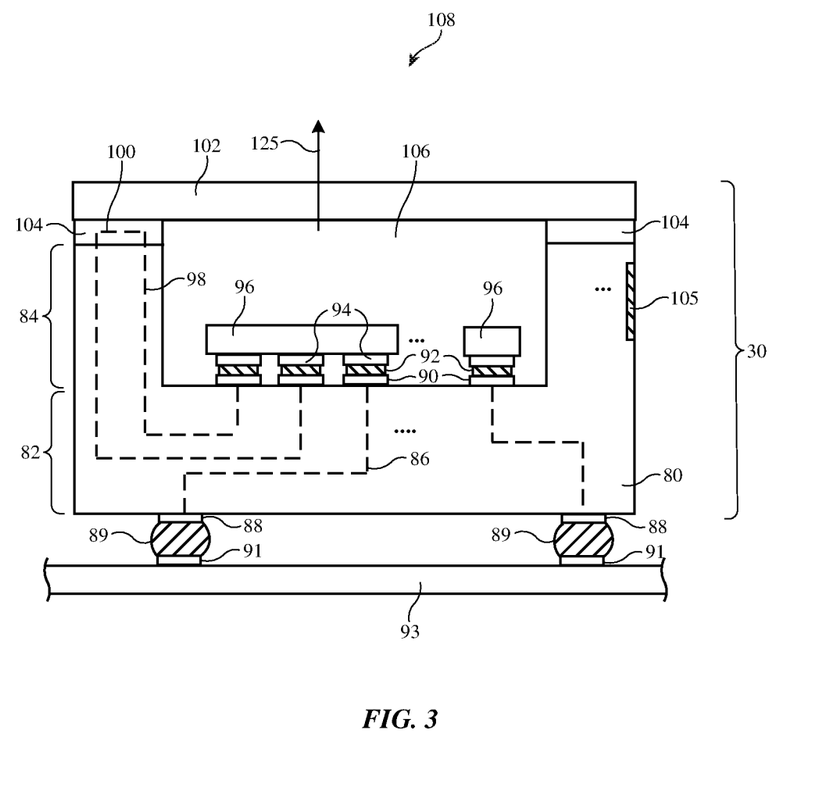
FIG. 3 is a cross-sectional side view of a light source for a head-mounted device in accordance with an embodiment.

During use of light-emitting devices 30 in gaze tracking sensors 20 and other components in device 10, light may be emitted towards a user's eyes. To enhance eye safety, packaged light-emitting devices 30 may be provided with protection circuitry. An illustrative light-emitting device 30 with protection circuitry is shown in FIG. 3. As shown in FIG. 3, light-emitting device 30 may include electrical components 96. Components 96 may include light-emitting components, control circuits, sensors, and other electrical devices. Components 96 may include discrete components, integrated circuits such as application-specific integrated circuits that are not programmable after hard coding, packaged and unpackaged components, and/or other components. Components 96 may be packaged within an electronic device package formed from package body 80 and package cover 102 or other package structures. Package body 80 may have a rear wall portion such as rear wall portion 82 and may have sidewall portions 84 (e.g., four sidewalls that help form a rectangular box shape for device 30) and/or package body 80 may have other configurations.

Package body 80 may be formed from polymer, glass, other dielectrics, metal and other conductors, and/or other materials and may include printed circuits, signal paths formed from metal traces, metal leads, and other conductive structures, and/or other package housing structures. Package cover 102 may be formed from a material such as glass, polymer, sapphire or other crystalline material, and/or other materials that are transparent to light emitted by a light-emitting component in components 96 in interior 106. This allows emitted light 125 to pass through cover 102 from interior region (interior) 106 to exterior region (exterior) 108. Cover 102 may cover some or all of the top of package body 80 and/or may cover other sides of package body 80. Cover 102 forms a window that is transparent at the wavelength of light 125 and/or at other desired wavelengths. If desired, cover 102 may be formed from a material that exhibits a non-linear transmission as a function of the intensity of light 125 (e.g., a non-linear optical crystal, a polymer that sustains damage and develops haze and/or opacity when exposed to higher light intensities, and/or other materials with non-linear-transmission). For example, cover 102 may be formed from a material that is transparent at normal operating intensities but that exhibits decreased levels of transparency at elevated operating intensities. In response to elevated light output intensities, the transparency of this type of cover will decrease and prevent more of light 125 from escaping the interior of device 30 than desired.

To clearly identify device 30 and thereby prevent device 30 from inadvertently being installed in equipment for which device 30 was not intended, device 30 can be provided with visual identifying information such as information 105. Information 105 may be a bar code, text, an icon, or a warning (e.g., an icon and/or text indicating that device 30 emits infrared light and/or that device 30 emits light with a certain maximum power), may have a predetermined color (e.g., a bright color such as orange, yellow, red, or other non-neutral color that helps indicate visually that device 30 is a light-emitting device), and/or may include other visually identifying information. This information may be provided over some or all of the exterior surface of body 80 and/or other portions of device 30. Information 105 may be formed by printing (e.g., screen printing of ink, ink-jet printing, etc.), spray coating of ink, laser marking, deposition of other solid and/or patterned materials, or other suitable fabrication techniques.

The device package formed from body 80 may include interior contacts 90 and exterior contacts 88. Contacts 88 and 90, may sometimes be referred to as solder pads, may be formed from metal traces or other conductive structures on the surfaces of body 80 in interior 106 and exterior 108, respectively. Contacts 90 may mate with corresponding contacts (solder pads) on electrical components 96 such as contacts (solder pads) 94. Solder 92 may be used to form solder joints that couple contacts 94 to respective contacts 90. If desired, conductive adhesive, welds, metal clips, spring-loaded pins, and/or other coupling structures may be used to couple the circuitry of components 96 to contacts 90.

Exterior contacts 88 may be configured to allow device 30 to be mounted to a printed circuit. As shown in FIG. 3, for example, solder 89 or other conductive material (e.g., conductive adhesive) may be used to couple contacts 88 to corresponding printed circuit contacts 91 on a printed circuit formed from printed circuit substrate 93. Other electrical components may also be soldered to the printed circuit and may be electrically interconnected with device 30 using metal traces forming signal paths in printed circuit substrate 93. Substrate 93 may be formed from rigid printed circuit material (e.g., fiberglass-filled epoxy) and/or flexible printed circuit material (e.g., a flexible sheet of polyimide or a layer of other flexible printed circuit polymer material).

Signal paths 86 in device 30 may be formed from metal traces (e.g., patterned thin-film metal layers and/or vias), stamped metal foil, wires, wire-bonded wires, metal members, and/or other conductive structures. These conductive structures may be formed on interior and/or exterior surfaces of body 80 and/or may include structures that are embedded within body 80. If desired, some of these signal paths may form a signal path such as signal path 98 that are used in detecting whether or not cover 102 has been removed. As shown in FIG. 3, trace 98 may have a portion such as portion 100 that passes adhesive layer 104 (e.g., by lying under adhesive 104, by lying over adhesive 104, and/or by passing through adhesive layer 104). Adhesive layer 104 may have a shape such as a ring shape that extends around the upper surface of sidewall portion 84 of body 80 and attaches cover 102 to body 80 to form the package for device 30. In the event that cover 102 is removed after assembly, the signal path formed from portion 100 will be damaged and an open circuit will be created in path 98. As a result, signal path 98 serves as a package integrity sensor that detects whether the device 30 (e.g., the package for device 30) has been opened.

Figure 4:
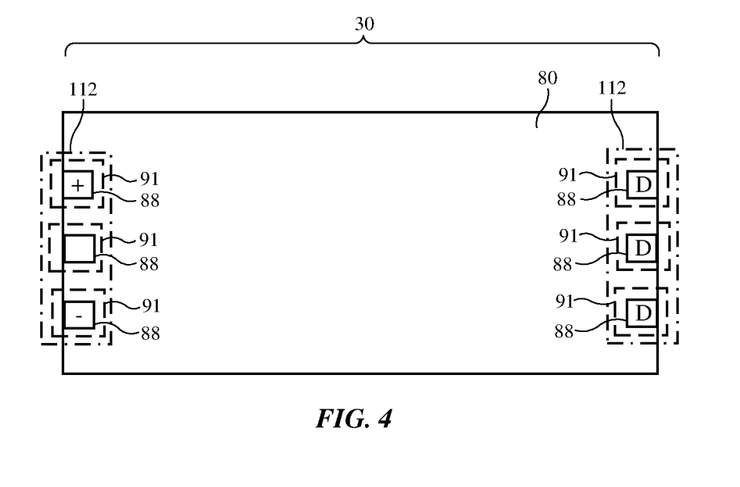
FIG. 4 is a bottom view of an illustrative light source showing a pattern of contacts that may be used to handle power and data signals in accordance with an embodiment.

A bottom view of device 30 of FIG. 3 is shown in FIG. 4. To reduce the likelihood that device 30 is inadvertently mounted on a printed circuit in a system for which device 30 was not intended (and thereby prevent inadvertent powering of device 30 and a resulting potential for light emission), contacts 88 may have a contact assignment pattern that is unique (or nearly unique) to device 30. A standard two-terminal light-emitting diode has first and second contacts at opposing ends of the light-emitting diode. This type of two-terminal light-emitting diode is therefore configured so that the first and second contacts will mate with and be soldered to corresponding first and second printed circuit board contacts 112 of FIG. 4 and will receive first and second corresponding power supply voltages through those contacts 112. In the illustrative configuration of device 30 of FIG. 4, in contrast, a first end of device 30 (e.g., a first end of body 80) has three contacts 88 and an opposing second end of device 30 (e.g., a second end of body 80) has three contacts 88. On a printed circuit board that is properly configured to operate with device 30 such as printed circuit substrate 93 of FIG. 3, six printed circuit contacts 91 are provided using a first set of three contacts 91 and a seconds set of three contacts 91. These six contacts 91 are configured to mate with contacts 88 without any of contacts 91 overlapping more than one of contacts 88 and without any of contacts 88 overlapping more than one of contacts 91.

The contact assignments for contacts 88 may have a pattern that is incompatible with standard printed circuit contacts 112. As a result, contacts 88 will only effectively provide power and other signals to device 30 when corresponding mating printed circuit contacts 91 are provided with an appropriate unique (or nearly unique) corresponding contact assignment pattern. In the example of FIG. 4, the first set of three contacts at the first end of device 30 includes positive (+) and negative (−) power supply contacts 88 on the outer sides of device 30, that receive, respectively first and second different power supply voltages from mating printed circuit contacts 91. The center contact 88 in the first set of three contacts may be coupled to a corresponding center printed circuit contact 91 and can be used for data, may be left floating, or may be coupled to the first or second power supply voltage or other suitable power supply voltage (as examples). The second set of three contacts at the second end of device 30 in the FIG. 4 example includes three data contacts D. Data contacts D may be used for analog and/or digital signals other than power supply signals (as an example). With this type of arrangement for the contact assignments (pin assignments) for device 30, it is not possible to inadvertently power device 30 by soldering device 30 to standard printed circuit contacts 112. Device 30 will only be powered properly and will only operate when powered correctly using the first and second power supply voltages supplied to the outermost terminals in the first set of three contacts at the first end of device 30. When device 30 is soldered to a printed circuit (e.g., printed circuit substrate 93 of FIG. 3) that has a contact pattern and contact assignment pattern that matches the contact pattern and contact assignment pattern of device 30, device 30 will be powered and can operate as part of device 10. In the event that device 30 is inadvertently incorporated into an electronic device that has a contact pattern configured to power a standard two-terminal light-emitting diode, device 30 will not operate and will not emit light, thereby enhancing safety.

Figure 5:
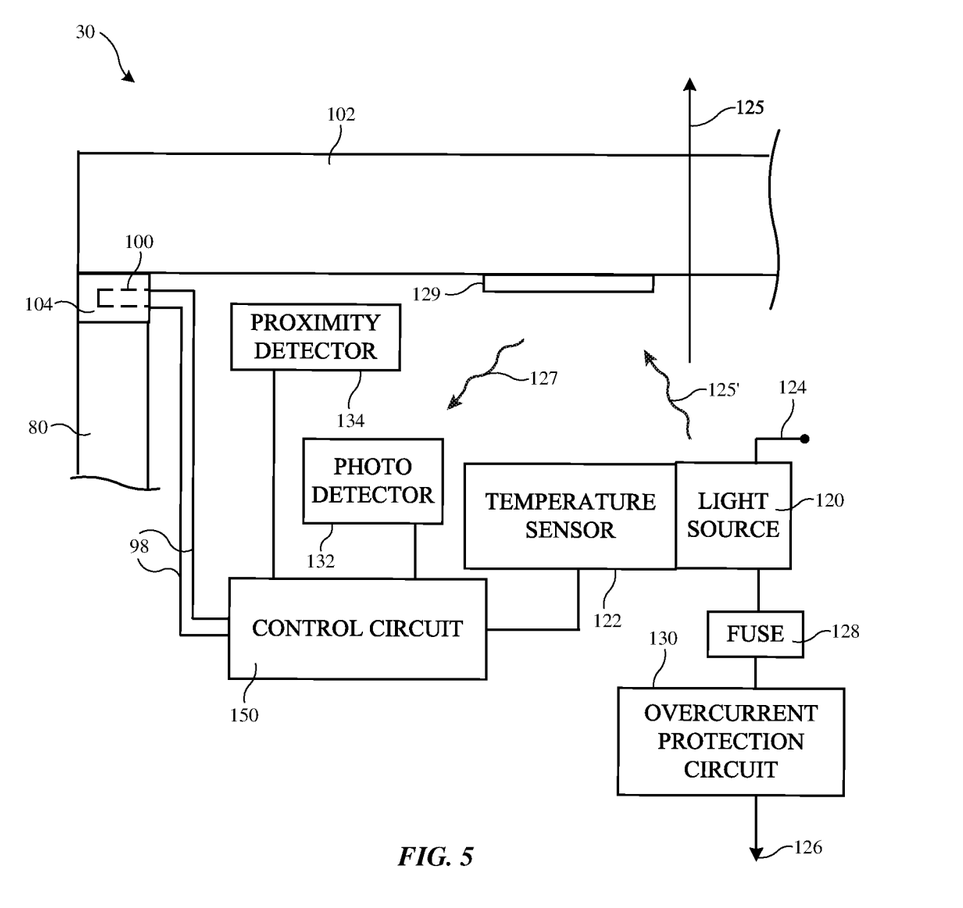
FIG. 5 is a circuit diagram of illustrative packaged light-emitting device circuitry in accordance with an embodiment.

FIG. 5 shows illustrative circuitry that may be incorporated into device 30. This circuitry may be formed using one or more packaged components and/or unpackaged components (e.g., bare semiconductor dies, etc.) such as one or more integrated circuits, discrete components, and/or other electrical components 96 of FIG. 3. The circuitry of FIG. 5 may include protection circuitry with one or more sensors to enhance safety.

As shown in FIG. 5, device 30 includes a light source such as light source 120. Light source 120 may include one or more light-emitting components such as light-emitting diodes and/or laser diodes. Configuration in which light source 120 includes a single light-emitting diode or laser diode are sometimes described herein as an example. Light source 120 may be configured to emit visible light, infrared light, and/or ultraviolet light. For example, light source 120 may be an infrared light-emitting diode or an infrared laser diode (e.g., a vertical cavity surface-emitting laser or other laser diode) that emits infrared light. During operation, emitted light 125 from light source 120 may pass through cover 102 (e.g., for use in gaze tracking sensor 20 or other circuitry in electronic device 10).

Control circuitry 150 may use one or more sensors to gather information on the status of device 30. In the event that a safe operating state is detected, light source 120 may be allowed to operate normally and can be powered with a current that flows through light source 120 between first power supply terminal 124 (e.g., a positive power supply terminal) and second power supply terminal 126 (e.g., a ground power supply terminal). Fuse 128 may be interposed in series with light source 120 between terminals 124 and 126. During normal operation, fuse 128 forms a closed circuit and allows current to be supplied to light source 120. Control circuitry 150 can dynamically adjust the amount of current flowing through light source 120 and/or a fixed amount of current may flow through light source 120, causing light source 120 to emit light 125. If an elevated amount of current starts to flow through fuse 128, fuse 128 will form an open circuit and will prevent current from flowing through light source 120, thereby preventing emission of light 125. Fuse 128 may be a passive component that is triggered (blown) by the level of current flowing through fuse 128 without additional external control.

If desired, overcurrent protection may also be provided using an electrically controlled overcurrent protection circuit such as overcurrent protection circuit 130. Protection circuit 30 may be coupled in series with light source 120 between power supply terminals 124 and 126. A current sensor in protection circuit 130 (e.g., a current sensor formed from a resistor coupled in series with source 120 and an associated voltage sensor that reads the voltage drop across the resistor) may inform control circuitry such as control circuit 150 in device 30 when an elevated amount of current is beginning to flow through circuit 130. Circuit 150 can then respond by directing overcurrent protection circuit 130 to form an open circuit (e.g., circuit 150 can supply a control circuit that directs a switch within circuit 130 that is coupled in series with light source 120 to form an open circuit). This blocks current flow through light source 120 and prevents emission of light 125.

Excessive temperature of light source 120 (which may be indicative of elevated current levels and elevated light emission by light source 120) may be detected using temperature sensor 122. Temperature sensor 122 may be thermally coupled to light source 120. Temperature measurements from sensor 122 may be gathered and processed by control circuit 150 during operation of device 30. In response to receiving temperature information from sensor 122 that indicates that the temperature of light source 120 has exceeded a predetermined threshold value, control circuitry 150 may direct protection circuit 126 (e.g., a switch coupled in series between terminals 124 and 126 in series with light source 120) to form an open circuit and thereby block current flow through light source 120.

Another sensor that may be included in device 30 is a light sensor such as photodetector 132. Some of emitted light 125 such as emitted light 125' may be detected by photodetector 132. Light 125' may, as an example, reflect from an inner surface of cover 120. Reflection can be enhanced by coating some or all of a surface of cover 120 (e.g., an inner surface) with a reflective coating to form light reflector 129. Light reflector 129 (or an uncoated portion of cover 120) may reflect light 125' towards photodetector 132 as reflected light 127, so that photodetector 132 can measure the magnitude of emitted light 125. During normal operation, emitted light 125 will have a normal magnitude and reflected light 127 will have a corresponding normal magnitude. If an enhanced amount of emitted light 125 starts to be emitted by light source 120, control circuit 150 will detect that the amount of emitted light that is measured by photodetector 132 has exceeded a predetermined threshold and will direct protection circuit 126 to form an open circuit in response. By blocking current flow through light source 120 in response to measuring with photodetector 132 that emitted light 125 has an elevated strength, elevated amounts of light emission are prevented.

To determine whether device 30 is adjacent to a user's eye or other body part, device 30 may have a sensor such as proximity sensor 134. Proximity sensor 134 may be formed from a capacitive sensor or other proximity sensor detection circuitry (e.g., an optical proximity detector, an acoustic proximity detector, etc.) that detects when external objects are within a predetermined distance of device 30. A capacitive sensor may also be used in detecting when cover 102 is present and when cover 102 is absent (e.g., a capacitive sensor may be used in forming a package integrity sensor for device 30). In response to detecting that cover 102 has been removed and/or in response to detecting that an external object is adjacent to device 30 (e.g., within a predetermined distance of light source 120 and/or other components of device 30), control circuit 150 may direct a switch (e.g., a switch in protection circuit 126) to block current flow through light source 120. As described in connection with FIG. 3, control circuit 150 may also monitor the integrity of device 30 using path 98. If cover 102 is removed, portion 100 of path 98 will be damaged and will form an open circuit and/or will otherwise exhibit a changed resistance. This change in portion 100 can be detected by control circuit 150 so that control circuit 150 can block current flow through light source 120 (e.g., by opening a switch in protection circuit 130).

Figure 6:
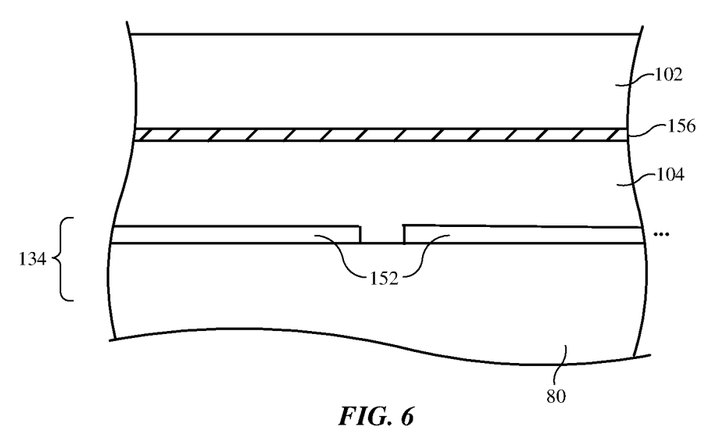
FIG. 6 is a cross-sectional side view of an illustrative capacitive sensor configured to detect the presence of a cover on a light source package in accordance with an embodiment.
Figure 7:
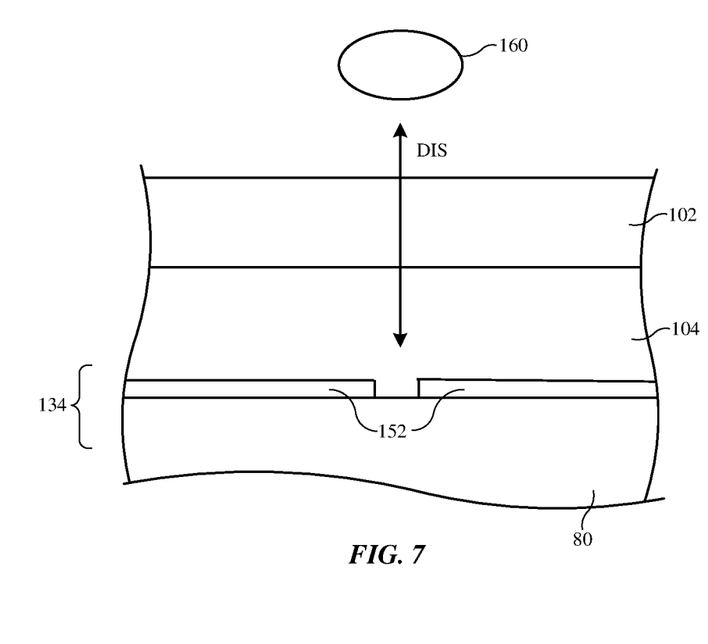
FIG. 7 is cross-sectional side view of an illustrative capacitive sensor configured to detect presence of a body part of a user or other external object in the vicinity of a light source in accordance with an embodiment.

FIGS. 6 and 7 show illustrative capacitive sensor circuitry that may be used in device 30. Capacitive sensing circuitry for device 30 may include self-capacitance and/or mutual capacitance circuitry and may be formed using metal traces configured to form one or more electrodes that are adjacent to cover 102 and/or located elsewhere in device 30. In the example of FIG. 6, cover 102 has an inner coating of metal such as metal layer 156 adjacent to capacitive sensor electrodes 152 in a capacitive sensor. Electrodes 152 may be formed under adhesive 104 and may be supported by a portion of body 80 or other support structure. If cover 102 is removed, metal layer 156 will no longer be in the vicinity of capacitive sensor electrodes 152 and the capacitance reading sensed by the capacitive sensor will change and be detected by control circuitry 150. Control circuitry 150 can then use block current flow through light source 120 (e.g., by opening a switch in protection circuit 130).

In the example of FIG. 7, a capacitive sensor in device 30 has been formed from capacitive sensor electrodes 152 under a portion of cover 102 (e.g., a portion of cover 102 that overlaps adhesive 104 and that allows electrodes 152 to be supported on a surface of body 80 or other support structure). In the event that a user's body (e.g., a user's eye or finger) or other external object 106 is close to device 30 (e.g., when distance DIS between external object 160 and the capacitive sensor electrodes 152 of the capacitive sensor is less than a predetermined threshold value), control circuitry 150 can direct protection circuit 130 to block current flow through light source 120. In general, a capacitive sensor in device 30 can be formed using capacitive sensor electrode structures (e.g., metal traces or other conductive structures) that are formed on cover 120, on body 80, and/or on other supporting structures in device 30. A capacitive sensor for device 30 may include first electrode structures to detect cover removal and/or second electrode structures to detect the presence of an external object adjacent to cover 102 (and therefor adjacent to light source 120) and/or a capacitive sensor for device 30 may use one or more shared capacitive sensor electrodes to detect both cover removal and external object presence. Arrangements in which other sensors (optical, etc.) for detecting external object proximity (including touch) and/or cover removal or other loss of package integrity may also be used, if desired.

Control circuit 150 may include analog processing circuitry and/or digital processing circuitry. In some configurations, solely analog processing circuitry may be used. In the illustrative arrangement of FIG. 8, the control circuitry of device 30 includes analog circuitry such as comparator 184. Protection circuit 130 may include switch 186 for controlling current flow through light source 120 and may include optional current sensor 187 for measuring current flow through light source 120. Control circuit 150 may control the output of light source 120 by adjusting the state of switch 186 based on information from current sensor 187 and/or other sensors in device 30.

Figure 8:
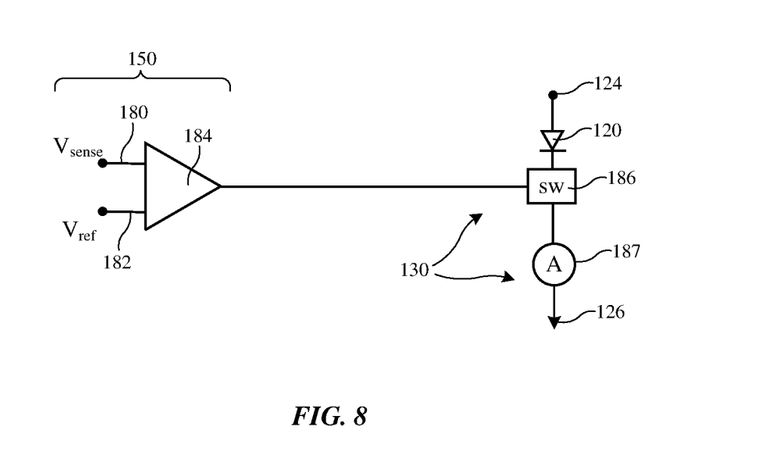
FIG. 8 is a diagram of an illustrative analog protection circuit in accordance with an embodiment.

Light source 120 of FIG. 8 may be formed from a light-emitting diode or light-emitting laser diode coupled in series with switch 186 between power supply terminal 124 and power supply terminal 126. Comparator 184 may be provided with a reference voltage Vref from a reference voltage source at terminal 182 and may receive a sensor output signal Vsense at terminal 180. Signal Vsense may be provided by a cover presence sensor formed from path 98, proximity sensor 134, photodetector 132, temperature sensor 122, current sensor 187 in overcurrent protection circuit 130, or other sensor in device 30.

During normal operation, Vsense is less than Vref and the output of comparator 184 has a first value, directing switch 186 to close and allowing current flow through light source 120 between terminals 124 and 126. In response to detection that Vsense has exceeded Vref (which serves as a threshold voltage), comparator 184 supplies a second value (e.g., a second value having a logic value that is opposite to that of the first value) at its output that directs switch 186 to open and block current flow through light source 120. In the example of FIG. 8, the operations of control circuit 150 can be handled using an analog control circuit such as comparator 184. If desired, other circuitry (e.g., digital and/or analog circuitry) can be used.

As described above, one aspect of the present technology is the gathering and use of user data such as data on a user's eyes gathered with gaze tracking sensors 20. The present disclosure contemplates that in some instances, gathered user data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, facial information, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide one or more types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. A head-mounted device, comprising:
a head-mounted support structure;
a display;
control circuitry configured to supply content using the display; and
a packaged light-emitting device operated by the control circuitry, wherein the packaged light-emitting device comprises:
a package body that has first and second ends with electrical contacts on an exterior of the packaged light-emitting device, wherein the electrical contacts include first and second contacts on the first end and a third contact on the second end and wherein the first, second, and third contacts comprise at least first and second power supply contacts configured to receive power at respective first and second different power supply voltages;
a cover attached to the package body;
a light-emitting component configured to emit light through the cover; and
a sensor configured to provide information based on which the light-emitting component is controlled.

2. The head-mounted device defined in claim 1, wherein the head-mounted device comprises a gaze tracker system, wherein the gaze tracker system includes the packaged light-emitting device and includes an image sensor, wherein the light-emitting component comprises an infrared light-emitting diode configured to emit infrared light towards an eye box, and wherein the sensor comprises a photodetector configured to measure the emitted infrared light.

3. The head-mounted device defined in claim 1 further comprising a gaze tracker system, wherein the gaze tracker system includes the light-emitting component and wherein the light-emitting component is configured to emit infrared light.

4. The head-mounted device defined in claim 3 wherein the sensor comprises a package integrity sensor configured to detect removal of the cover.

5. The head-mounted device defined in claim 4 wherein the packaged light-emitting device further comprises adhesive that attaches the cover to the package body and wherein the package integrity sensor comprises a signal path that passes the adhesive.

6. The head-mounted device defined in claim 4 wherein the package integrity sensor comprises a capacitive sensor.

7. The head-mounted device defined in claim 3 wherein the sensor comprises a capacitive proximity sensor.

8. The head-mounted device defined in claim 3 wherein the sensor is configured to measure current flow through the light-emitting component.

9. The head-mounted device defined in claim 3 wherein the light-emitting component has a temperature and wherein the sensor comprises a temperature sensor configured to measure the temperature.

10. The head-mounted device defined in claim 3 wherein an exterior surface of the package body is colored with a warning and wherein the warning comprises a warning selected from the group consisting of: a non-neutral color serving as a warning, warning text, and a warning icon.

11. The head-mounted device defined in claim 3 wherein the packaged light-emitting device further comprises a fuse coupled in series with the light-emitting component.

12. The head-mounted device defined in claim 3 wherein the packaged light-emitting device further comprises a switch coupled in series with the light-emitting component and wherein a control circuit is configured to control the light-emitting component by controlling the switch based on the information from the sensor.

13. A packaged light-emitting device, comprising:
a package body having an exterior surface with solder pads;
a cover coupled to the package body, wherein the cover has a non-linear light transmission versus light intensity characteristic;
an infrared light-emitting component configured to emit infrared light through the cover;
a control circuit that receives sensor output and that supplies a corresponding output signal; and
a switch coupled in series with the infrared light-emitting component, wherein the control circuit controls the switch using the output signal.

14. The packaged light-emitting device defined in claim 13 wherein the control circuit comprises a comparator having an output that supplies the output signal, wherein the packaged light-emitting device further comprises a sensor that supplies the sensor output, and wherein the sensor comprises a sensor selected from the group consisting of: a temperature sensor, a current sensor, a photodetector, a proximity detector, and a package integrity sensor.

\* \* \* \* \*